Aug. 12, 1941. G. HOLST ET AL 2,252,006
SOUND-PICTURE FILM AND METHOD OF PRINTING THE SAME
Filed Jan. 6, 1939
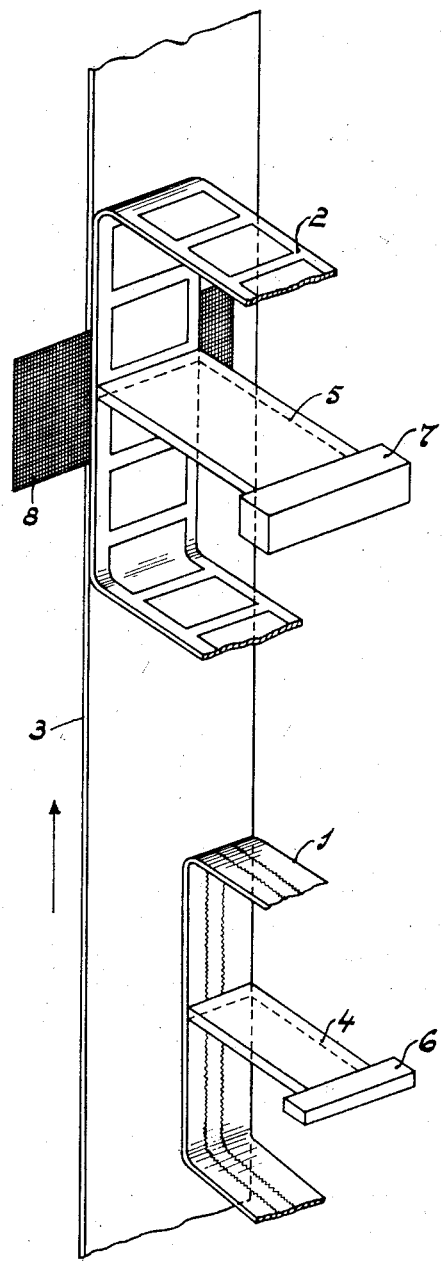
INVENTORS
GILLES HOLST
ROELOF JAN HENDRIK ALINK
KLAAS JANNES KEUNING
BY
ATTORNEY.

Patented Aug. 12, 1941

2,252,006

UNITED STATES PATENT OFFICE 2,252,006

SOUND-PICTURE FILM AND METHOD OF PRINTING THE SAME

Gilles Holst, Roelof Jan Hendrik Alink, and Klaas Jannes Keuning, Eindhoven, Netherlands, assignors, by mesne assignments, to Hartford National Bank and Trust Company, Hartford, Conn., as trustee Application January 6, 1939, Serial No. 249,656
In Germany January 8, 1938

4 Claims. (Cl. 95—5)

The present invention relates to sound-picture films in which both the sound portion and the picture portion are photo-chemically formed and the sound portion is to be reproduced with the aid of a photo-electric cell, and to a method of printing such films.

In reproducing sound-picture films having a sound track which has light-transmitting portions of variable width, i. e., a track of the variable-area type, it is very desirable that the gamma-value of the track be large. On the other hand, to secure satisfactory reproduction of the images it is desirable that the picture portions have a low gamma value.

The object of our invention is to produce in a simple manner a sound-picture film in which the sound portions have a high gamma-value and the picture portions have a low-gamma value. For this purpose we use for the positive film a printing material whose gamma-value is suitable for the sound track, and print the sound portions directly thereon from a negative. However, in printing the picture portions we pass the light used for this purpose through a grating located between the negative and positive films and placed in close contact with the sensitized surface of the positive film, and thereby give the picture portion a lower gamma-value.

The grating may be of either regular or irregular structure, and has portions which absorb more or less light with the result that when the positive is developed the picture portions thereof will have over their entire area portions of increased transparency corresponding to the structure of the grating. If the grating were not placed in close contact with the positive this effect would not be secured because of the diffraction of the light.

By using the method of the invention it is possible to give both the picture portion and the sound portion the desired gamma-values in a very simple manner, and the further treatment of the positive film, i. e. developing, etc., can be effected in the usual manner without taking any special steps for obtaining a difference in the gamma-values of the sound and picture portions.

In order that the invention may be clearly understood and readily carried into effect, we shall describe the same in more detail with reference to the accompanying drawing, in which the single figure is a diagrammatic view of a portion of a printing apparatus for carrying out the method of the invention.

In the drawing a negative sound film 1 of the variable area type and a negative picture film 2 are moved continuously together with a positive film 3 in the direction of the arrow past light beams 4 and 5 of rectangular cross section produced by suitable light sources 6 and 7. In accordance with the invention, a grating 8 is arranged stationary between the films 1 and 3 and in close contact with the sensitized surface of the positive film 3.

Although grating 8 is the ordinary cross-grating, as is used in the so-called chemigraphy, but for a quite different purpose, a point-grating may also be used. When using grained materials, i. e. photographic emulsions, the grating should have a structure which is much coarser than the granular structure of the photographic material. When the pictures are very small we prefer to use grainless positive photographic material together with a grating which is very fine but in which the spacing between the grating portions are greater than the wave-length of the copying light. It is also possible to use the so-called grained gratings.

The invention is of particular advantage in those cases in which the images on the picture are formed of a metal applied by "physical development." By "physical development" is meant a development in which, prior to the development of the contrasts, all the metal necessary for the production thereof is not yet present, neither as such nor in combined state, at the place of the image. This physical development is effected with the aid of a metallic salt adapted to be reduced to metal in an aqueous solution, such as a salt of mercury, silver, gold or platinum.

It is particularly advantageous to produce such grainless metal contrasts in a transparent carrier consisting, for example, of regenerated cellulose, because it greatly improves the sound production. Such metal contrasts may be obtained by the method described in the copending U. S. patent application Ser. No. 125,653 to Holst et al., filed February 13, 1937, now Patent No. 2,150,834.

A method in which a metal image is produced with the use of a light-sensitive diazonium compound and of a metallic salt liable to be reduced to metal in an aqueous solution is very suitable. Thus, for example, it has been described to produce in this way a silver image with the aid of a silver salt. Particularly satisfactory contrasts may be obtained by utilizing a diazonium compound in combination with a mercurous salt, as set forth in the above-mentioned application, in which event a mercury image may be obtained, which can be made strong and of very good covering capacity by physical development with the aid of a silver salt.

Although it is known to produce picture films with the use of a diazonium compound by converting the diazonium compound into an azo dye to obtain in this manner film material, for example, with the aid of a carrier consisting of very thin cellulose foils, it has been found that the contrast obtained by an azo dye is less suitable for sound reproduction, particularly if the sound reproduction is to be effected with the aid of a photo-electric cell which has a specific sensitiveness in the infra-red region of the spectrum. However, a metal image compared with an azo dye image produces a very much greater contrast with regard to the absorption in the infra-red portion of the spectrum. The contrasts consisting of metal are therefore particularly suitable for the above-mentioned sound reproduction, and by employing the method of printing according to the invention, they can at the same time be made suitable for the picture portion of the film.

While we have described our invention with reference to specific examples and applications, we do not wish to be limited thereto, but desire the appended claims to be construed as broadly as is permissible in view of the prior art.

What we claim is:

1. A method of producing a positive film having a picture portion and a variable-area sound portion which are provided photo-chemically and a gamma value suitable for a sound track, comprising the steps of passing light through the sound portion of a negative directly onto the sound portion of the positive, passing light through the picture portion of the negative and then through a grating separate from the positive and located in contact with the surface of the picture portion thereof, and developing the positive film.

2. A method of producing a positive film having a picture portion and a variable-area sound portion, which are provided photochemically and a gamma value suitable for a sound track, comprising the steps of passing light through a negative sound film directly onto the sound portion of the positive, passing light through a negative picture film and through a grating separate from the positive and located in contact with the surface of the picture portion thereof and developing the positive film.

3. A method of producing a positive film having a picture portion and a variable-area sound portion, comprising the steps of passing light through the sound portion of a negative directly onto the sound portion of the positive, passing light through the picture portion of the negative and through a grating located in close contact with the picture portion of the positive, and physically developing the positive.

4. In an apparatus for printing sound and pictures on a positive film having a sound portion and a picture portion and a gamma value suitable for a sound track, a stationary grating separate from the positive film and in close contact with the surface of only the picture portion thereof, means to pass the sound-copying light directly upon the sound portion of said film, and means to pass the picture-copying light through said grating and upon the picture portion of the film.

GILLES HOLST.
ROELOF JAN HENDRIK ALINK.
KLAAS JANNES KEUNING.